Dec. 5, 1961  W. G. COPP  3,011,529
TILT AND ELEVATING MECHANISM FOR TILTING ARBOR SAWS
Filed Sept. 8, 1959  3 Sheets-Sheet 1
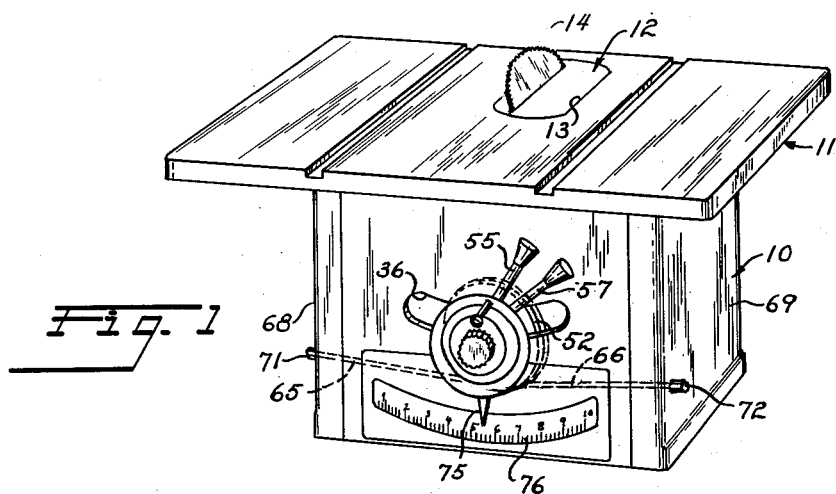
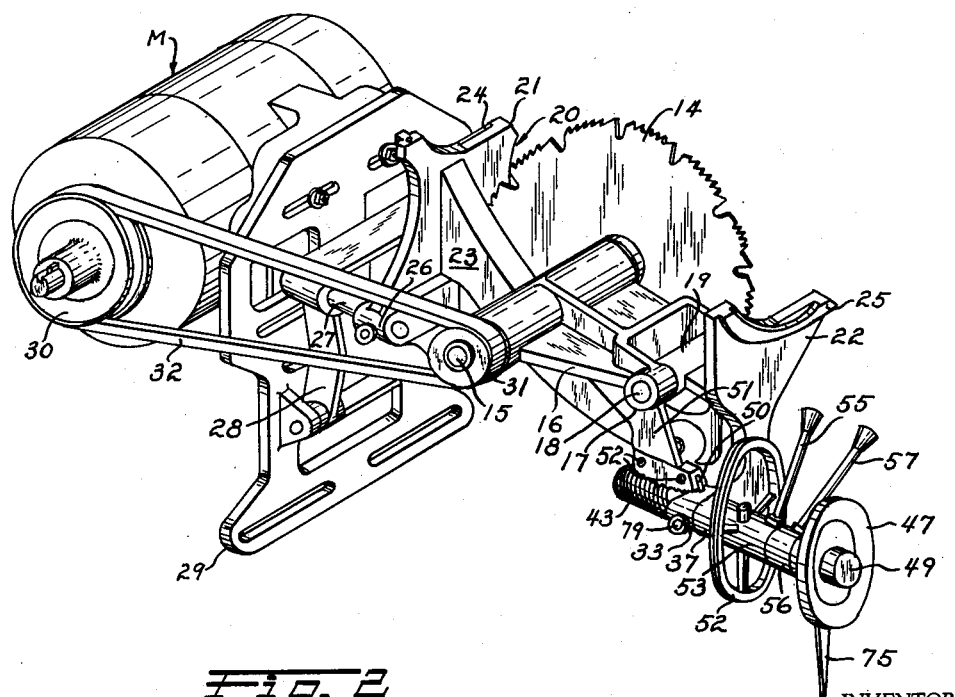
INVENTOR
WILLIAM G. COPP
BY *Strauch, Nolan & Neale*
ATTORNEYS

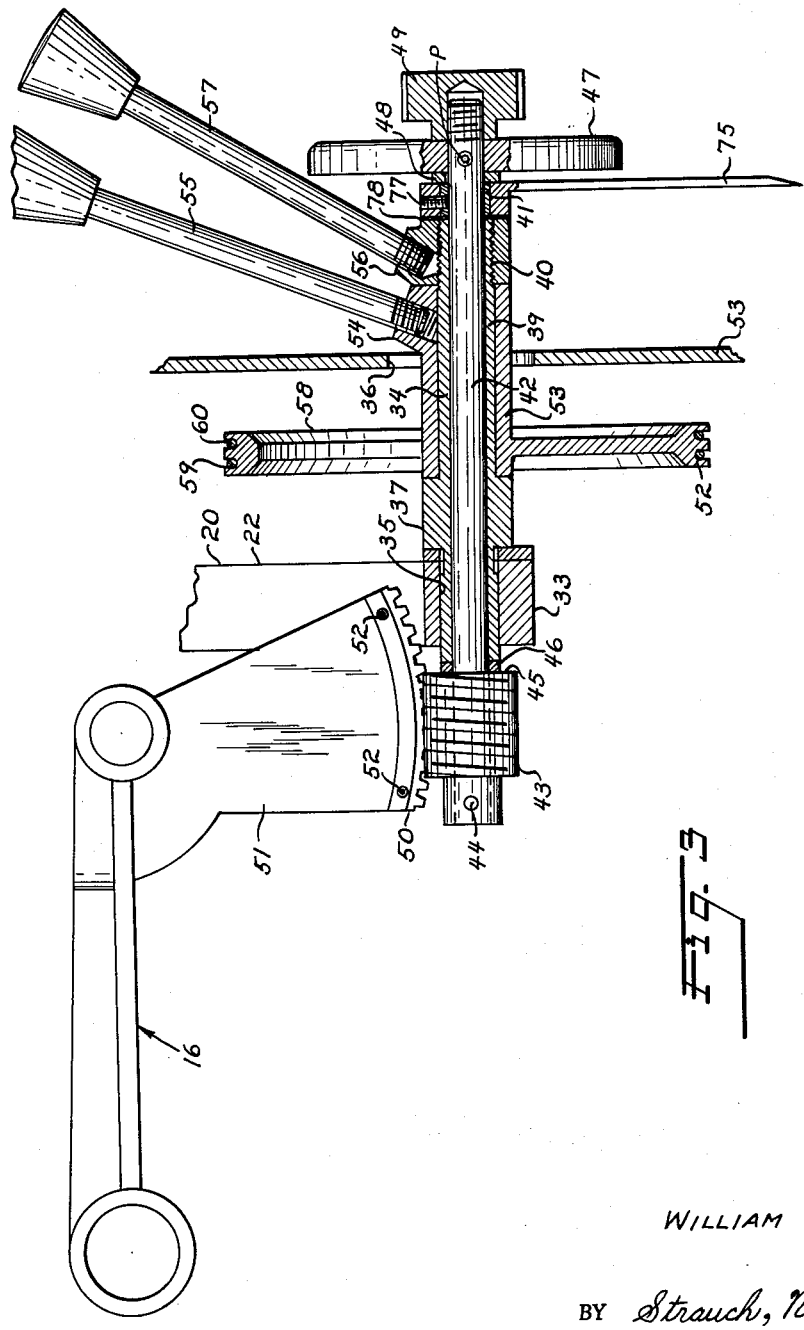

Dec. 5, 1961  W. G. COPP  3,011,529
TILT AND ELEVATING MECHANISM FOR TILTING ARBOR SAWS
Filed Sept. 8, 1959  3 Sheets-Sheet 3
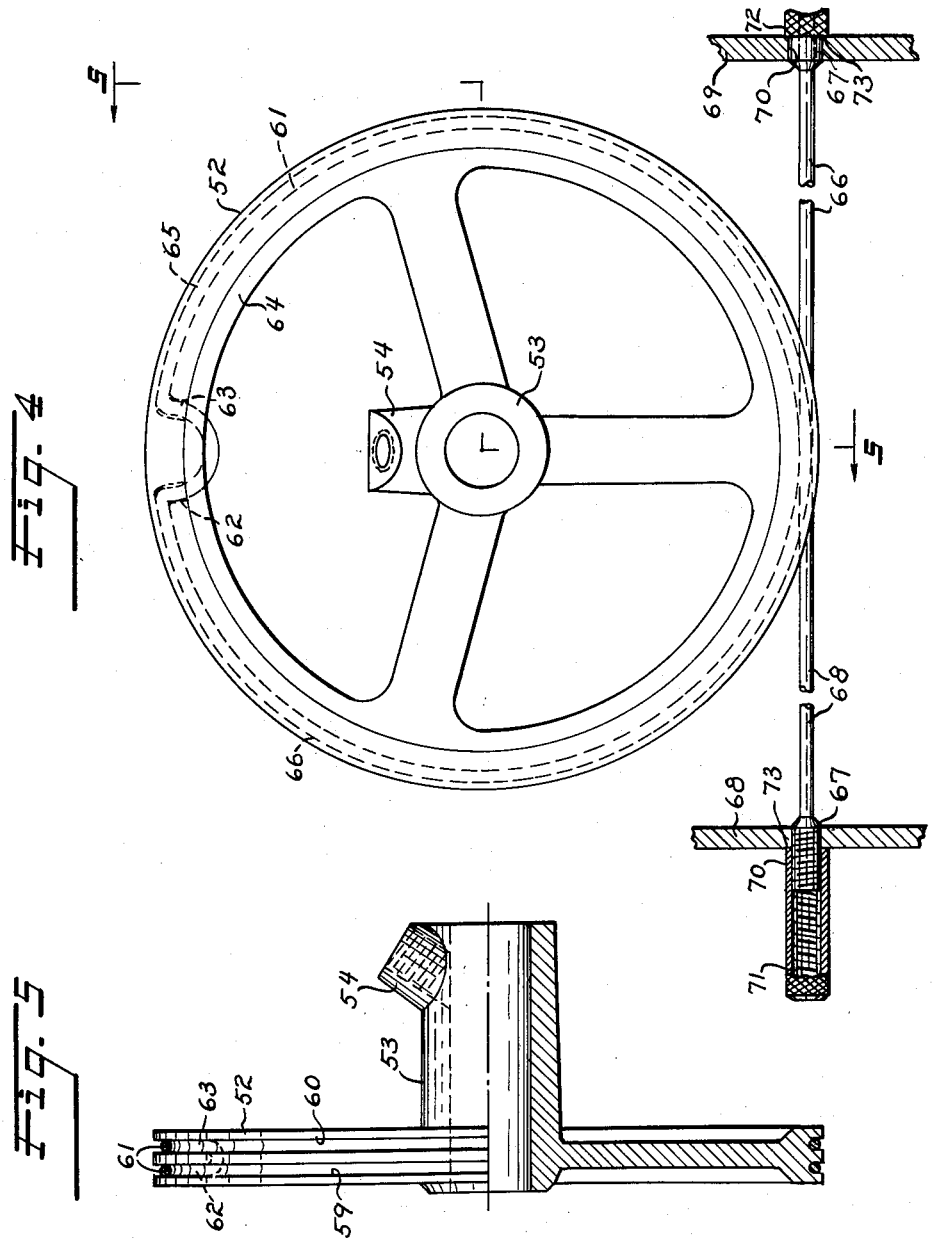
INVENTOR
WILLIAM G. COPP
Strauch, Nolan & Neale
ATTORNEYS United States Patent Office 3,011,529
Patented Dec. 5, 1961

3,011,529
TILT AND ELEVATING MECHANISM
FOR TILTING ARBOR SAWS
William G. Copp, Guelph, Ontario, Canada, assignor to Rockwell Manufacturing Company, Pittsburgh, Pa., a corporation of Pennsylvania
Filed Sept. 8, 1959, Ser. No. 838,767
9 Claims. (Cl. 143—36)

This invention relates to tilting arbor saws and more particularly to an improved raising and tilting mechanism for such saws. In many tilting arbor saws both raising and tilting are achieved by independent and separately located handwheel driven screws. These can be made to provide very precise movement. However, they are costly. Further the tilt handwheel must be mounted to the side of the saw stand or cabinet and under the table where it is inconvenient for operation. It is accordingly apt to be somewhat difficult to reach particularly with side table extensions in use.

Because of these factors and because of the cost of the long screw needed to provide the required 45 degree tilt other saws have been provided in which the tilting of the saw is accomplished by manually swinging it back and forth and locking it in a selected position. As will be realized this provides a quick and easy operation but it is difficult to obtain precise intermediate positions with such structures. This is particularly true where the weight to be swung may be considerable as, for example, in a good saw wherein the motor is supported on the beam and which must be swung to adjust the tilt of the saw.

It, accordingly, has been recognized that some alternative or substitute for the long tilt screw is needed while providing accurate control of both the height and the tilt of the saw arbor from a single convenient position at the front of the saw where the operator normally stands. In one prior known construction (see United States Letters Patent 2,844,173 to W. L. Gaskell dated July 22, 1958) there is provided a single handwheel which is adapted to be moved lengthwise to alternately engage separate gear elements for the raising and tilting mechanism. This type of control provides great precision and easy operation as compared to those saws wherein the saw support is simply pushed sideways but is quite expensive.

The instant invention has for its primary object the provision of a combined tilt and elevation adjusting mechanism which makes it possible to eliminate a second lead screw yet which provides desired ease of operation and adjustment sensitivity.

The invention has as a further object to provide a single lead screw type of control operable from the front of the saw cabinet for both raising and tilting the saw which does not involve "shifting gears" or a duplication of expensive gear mechanism.

A further object of the invention is to provide a simplified tilting mechanism wherein quick acting and accurate tilting can be obtained with a minimum of effort.

Another object of the invention is to provide a positive guide means for tiltably moving a saw arbor with ample leverage for precise control of the movements in tilting.

An additional object of the invention is to provide a combined saw arbor adjustment control wherein adjustment of tilt or height can be quickly selectively achieved without either adjustment affecting the other.

Still another object of the invention is to provide an adjustment control as set forth in the preceding object wherein ample leverage is provided to achieve a maximum sensitivity and preciseness of tilt control.

Yet another object of the invention is to provide a raising and tilting mechanism concentrically arranged with respect to a single handwheel operated lead screw which results in a mechanically simplified construction.

It is also an object of this invention to provide a simplified locking means for locking both the elevating and tilting mechanism.

Another object of the invention is to provide tension means facilitating the retention of a selected degree of tilt.

A still further object of this invention is to provide an adjustment means for accurately moving the saw and its arbor into selected tilted positions which is of simplified construction and includes a reliable cable tension means and a simple, yet positive non-slip connection between the pulley and cable which facilitates accurate reliable, easy tilt adjustment.

It is also an object of this invention to provide a pulley-cable tilt adjustment means concentrically disposed with respect to the saw arbor height adjustment shaft in which there is simplified locking means for locking the cable to the pulley.

It is also an object of this invention to provide a tilting arbor saw mechanism having a track mounted arbor carrier and tilting and raising and lowering means mounted to provide a simplified reliable and durable single point control.

Still another object of the invention is to provide a sleeve type pulley shaft tilting mechanism carried by the arbor raising lead screw and including means for locking both the tilting and the raising and lowering mechanism.

Still another object of the invention is to provide a precision tilting and lowering and raising mechanism that is of inexpensive construction yet provides a single point control center.

These and other objects and advantages will become apparent from the following description and the accompanying drawings wherein:

FIGURE 1 is a perspective view of a tilting arbor saw having a combined tilting and raising mechanism constructed in accordance with this invention.

FIGURE 2 is a perspective view from the side and top with the table and cabinet removed and showing the saw arbor support, tilting frame or quadrant, motor support and motor, and the tilting and raising mechanism of this invention.

FIGURE 3 is a fragmentary sectional view partly in section showing the saw arbor support and the operating means for controlling the tilting as well as the raising and lowering of the saw and its arbor.

FIGURE 4 is a front elevational view of the pulley and cable and the connecting means therefor associated with the cabinet sidewalls of the saw.

FIGURE 5 is a side elevational view partly in section of the pulley and cable of FIGURE 4 taken along line 5—5 of FIGURE 4.

The concept of the present invention includes the provision of a means for controlling the raising and lowering as well as the tilting of the saw and its arbor from the front of the saw with what may well be referred to as single point control. Further, the inventive concept includes the provision of structure accomplishing such purposes which is simple as contrasted with that heretofore employed for similar quality saws and assures a preciseness of control of the movements of the saw as desired by particular craftsmen.

Referring more specifically to the drawings, and FIGURES 1 and 2 in particular: The invention, in one preferred form illustrated in the drawings, embodies a tilting arbor saw comprising the usual cabinet 10, a work support table 11, and a blade insert 12 removably received in the conventional blade opening 13. The insert has a slot to receive the saw blade 14 in well known manner.

As is well known in the art, it is preferable to have both vertical and angular adjustment of the saw blade so as to provide for varying depths of cut and to provide for cutting at angles for miter joints, etc.

The saw blade is conventionally supported on an arbor or mandrel 15. The arbor or mandrel is journaled in an arbor bracket or tool mount 16 providing two laterally spaced mounting bosses 17, only one of which is shown in the drawings (see FIGURE 2). These bosses journal a bracket pivot shaft 18 fixedly supported in a boss 19 centered between bosses 17 and secured to and preferably formed as an integral part of a tool support structure or quadrant 20. The quadrant comprises a pair of spaced end plates 21 and 22 rigidly connected to each other by a beam 23. The end plates are usually parallel to each other and each of the plates has a trunnion formation 24 and 25, respectively, formed at its upper end adapted to be supported in the tracks of quadrant brackets of well known form fixed to the under side of table 11 in conventional manner. The trunnions and their cooperating tracks are formed about a horizontal axis lying in the plane of the top work support surface of table 11 and extending through the center of opening 13. This is known structure and additional details are accordingly neither shown nor described.

It is apparent that the saw blade 14 and its arbor 15 can be tilted out of the vertical position toward the right side of the table, as viewed in FIGURE 1, by swinging quadrant 20 with respect to the table around the axis of the quadrant brackets in conventional manner.

It is also apparent that the saw blade 14 and its arbor 15 can be raised and lowered within the opening 13 and with respect to insert 12 by swinging of the arbor bracket 16 on bracket pivot shaft 18 in conventional manner.

The rear end plate 21 has at each of its lower corners a boss 26 (only one of which appears in FIGURE 2) adapted to receive a pair of support pins 27. A motor support bracket structure including the frame 28, which is directly connected to the support pins 27, and the pivoted motor base attachment plate 29 is mounted on the rear end plate 21 again in more or less conventional manner. The motor M is attached to the plate 29 by bolts extending through the base of the motor. The motor shaft is provided with a drive pulley 30, and the arbor 15 is provided with a driven pulley 31. A drive belt 32 interconnects the two pulleys. As is known in the art, the weight of the motor M provides the tension for the belt in this type of construction. As further known in the art the motor M is carried by quadrant 20 so that as the saw blade and its arbor tilt the motor M also tilts in unison. Thus the two drive pulleys are maintained always in alignment irrespective of the tilt position of the saw blade. However, this requires that whenever the saw blade is tilted sufficient force must be applied to move the total suspended weight of the saw blade, arbor, quadrant, motor, and motor support.

The heretofore described elements are more or less conventional. In the prior art for many years, individual long screws have been connected respectively to the mandrel bracket and the quadrant, usually at 90° angular positions, to raise and lower the saw blade and tilt the saw blade. These prior art screws extended respectively through the front and sidewalls of the cabinet necessitating that the operator move to the side of the saw, and crouch down beneath the side table extension plates when used, to effect a tilt adjustment of the saw blade and its arbor. According to the instant invention, however, the front end plate 22 alone is provided with a boss 33 having an opening 35 opposing the cabinet front wall and parallel to the tilt axis. This opening 35 receives a sleeve 34 which forms outer and inner journal surfaces for the tilt and elevation shafts. Sleeve 34 is fixed in the sleeve receiving opening 35 by means of a setscrew 79 (see FIGURES 2 and 3). Sleeve 34 forwardly of the front end plate 22 is enlarged at 37 and extends forwardly a substantial distance through an arcuate slot 36 formed in the front wall of cabinet 10. The forwardly extending portion of sleeve 34 provides a cylindrical reduced stem section 39 terminating at its forward end in a threaded portion 40 and a reduced diameter tip 41. The sleeve 34 also has a longitudinal through bore and a worm shaft 42 is journalled in and extends through the longitudinal bore with its opposite ends protruding. A worm pinion 43 is secured to the inner end of the shaft 42 by a roll pin 44. Worm pinion 43 has an end face 45 opposing boss 33 of end plate 22 and the inner end of sleeve 34 and is separated from the inner end of sleeve 34 by a fibre washer 46. While a substantially non-compressible fiber washer is preferably used, it is to be understood that any suitable anti-friction separator could be employed at this point.

Worm shaft 42 extends forwardly of tip 41 of sleeve 34 to receive a handwheel 47 which is pinned to shaft 42 by a roll pin P and separated from the tip 41 of sleeve 34 by a fibre washer 48. The front end of shaft 42 is threaded to receive a locking handknob 49. Worm 43 is meshed with an arcuate rack segment 50 preferably secured in an elongated bifurcated socket formed on a depending arm 51 of arbor bracket 16 by pins 52. Segment 50 is concentric with the axis of bracket pivot shaft 18.

It is apparent that by rotating the shaft 42, by means of the handwheel 47, the worm 43 will be rotated, rack 50 and arbor bracket 16 will be rotated around the axis of shaft 18 so as to raise or lower the saw blade and its arbor. The pinned connection between worm pinion 43 and shaft 42 and shaft 42 and the handwheel 47 provides for slight longitudinal movement of shaft 42 relative to sleeve 34 so that upon tightening of handknob 49 shaft 42 and its associated parts will be firmly located against rotation relative to sleeve 34. It is apparent, accordingly, that when the locking handknob 49 is threaded inwardly upon shaft 42 it will force the handwheel and washer 48 toward tip 41 of sleeve 34 and also force face 45 and washer 46 toward the opposite end of sleeve 34. This serves as a locking means for the elevating mechanism. This movement is very slight, in the nature of two or three thousandths of an inch. However, this is sufficient to adequately lock the saw blade and its arbor at any selected height. The handwheel 47, due to anti-friction washers 45 and 48, can be freely rotated whenever locking handknob 49 is backed off.

A pulley wheel 52 having an elongated hub 53 is rotatably supported on the reduced stem section 39 of sleeve 34. One face of hub 53 abuts the forward face of enlarged section 37 while the elongated portion extends forwardly through slot 36 in the front wall of cabinet 10. Hub 53 at one portion of its forward end along the periphery is provided with an angular boss 54 in which there is secured a tilt lever 55. A threaded connection is preferred between lever 55 and boss 54. A locking nut 56 is threaded on thread portion 40 of sleeve 34 and is adapted, upon opposite threaded movement, to move longitudinally therealong toward and away from the forward face of pulley wheel hub 53 to lock and unlock pulley wheel 52 to effect tilting adjustment of quadrant 20 and its associated arbor bracket 16, arbor 15 and saw blade 14. Locking lever 57 is preferably threadedly secured in the angled hub of nut 56 to facilitate the rotation of the locking nut with respect to the sleeve 34.

It is apparent that when locking lever 57 is rotated so as to advance nut 56 to the left, as shown in FIGURE 3, the pulley hub 53 will be jammed between the enlargement 37 and nut 56 to lock the tilting mechanism against relative rotation around sleeve 34. Likewise when lever 57 is rotated so as to advance the nut 56 to the right pulley hub 53 will be freed from its clamped engagement and can then freely rotate on the sleeve 34 to effect a tilt adjust of saw blade 14 and its supporting quadrant 20 in well known manner.

Pulley 52 (see FIGURES 4 and 5) has a pair of parallel grooves 59 and 60 formed in its outer periphery. These grooves are shaped to receive the center portion of a cable 61. A cable crossover between grooves 59 and 60 is provided by drilling two radial holes 62 and 63—one in each of the grooves. The holes extend inwardly from their respective grooves at opposite sides of the interior of the rim 64 with one of the holes being spaced to one side of rim center and the other to the opposite side of the rim center. As is viewed in FIGURE 5, the cable 61 is passed downwardly inwardly of the pulley through one hole 62 in one groove and over rim 64 and upwardly through the hole 63 into the other groove. The cable after passing through these two holes and over the depending plate extends downwardly around the pulley within each of the grooves. With the pulley in the position illustrated in FIGURE 4 the cable extends throughout more than one-half of each of the grooves and its opposite ends extend tangentially in opposite directions from the respective grooves.

Thus, referring again to FIGURE 4, the righthand run of the cable 61 passes downwardly through its groove and then off the pulley to the left as indicated by end 65 whereas the left run comes similarly downward in its groove and then passes off to the right as indicated by end 66. It is apparent that if the two ends of the cable are fixed and the pulley is rotated it will take on cable from one side and pass it off from the other. The free ends 65 and 66 of the cable are of equal length when the pulley is in the 22½° angle or 22½° position of blade 14 as illustrated in FIGURE 1.

Each of the ends of the cable is welded to a cable adjusting stud 67 threadedly secured in the opposite side walls 68 and 69 of the saw cabinet which are provided with openings 70 in tangential alignment with the lower run of pulley 52 (see FIGURE 4). Each of these openings 70 is adapted to receive a respective stud 67 which is in turn threaded into anchor nuts 71 and 72. Nuts 71 and 72 are of hexagonal configuration and provide abutment faces 73 adapted respectively to bear against the opposite cabinet sidewalls. The studs are adapted to be rotatably received within the openings 70 in the side walls 68 and 69 and are adjustably coupled to the anchor nuts so as to place both ends of cable 61 in tension in the zero position of the tilting mechanism to eliminate all lost motion from the tilt adjustment.

It is apparent that as quadrant 20 is swung from one side to the other pulley 52 must rotate on sleeve 34 and as this rotation occurs the cable is respectively passed in on one side and out from the other side of the pulley. The lever 55 is preferably of greater length than the radius of the pulley and in the embodiment illustrated the pulley is of a size such that the quadrant can be moved from zero to 45 degrees with a lever movement of less than one-half a revolution.

It is apparent that the construction and operation of the tilt mechanism is simple. The nut 56 is merely backed off to free the hub 53 of pulley 52 from its clamped engagement with enlargement 37 and then lever 55 is rotated to select the desired angle of tilt. The leverage provided by pulley 52 facilitates movement of the weight of the motor and the other suspended elements. It also provides a sensitiveness and accuracy of movement not heretofore achieved with quadrants which have been simply swung manually or gear driven from one side to the other.

To assure accurate setting of the tilt angle, a pointer 75 is fixedly secured to sleeve 34 to swing as a unit with quadrant 20 and blade 14 around the axis of the trunnion supports along a graduated scale 76 fixed to the front cabinet wall adjacent arcuate opening 36. Preferably pointer 75 is secured to tip 41 of sleeve 34 by a set screw 77 (FIGURE 3) so it can be shifted around the axis of sleeve 34 to accurately calibrate the scale and pointer of each machine. An axial clearance 78 is provided between the opposing faces of nut 56 and the hub of pointer 75 to permit proper operation of nut 56.

From the foregoing it will be apparent that I have devised a simplified tilt and raising and lowering mechanism for tilting arbor saws. This mechanism provides control from the front of the cabinet and yet provides an accuracy and preciseness not heretofore achieved with many other mechanisms of a similar type. Further there is an absence of gear structure including quadrant attached gear sections such as required in some of the existing single point control systems devised for saws of a similar type.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A control support structure for mounting a tilting arbor saw and motor structure in an enclosing table topped cabinet having trunnion brackets adjacent its front and back walls comprising a support quadrant having respective front and back end plates; trunnion means along the upper end plate edges for suspending said support quadrant from the trunnion brackets; a motor plate and motor having a drive pulley hingedly connected to said back end plate; a mandrel bracket pivotally connected to said front end plate; a mandrel journalled in said mandrel bracket and having a saw blade on one end and a driven pulley on its other end; belt means for drivingly connecting said drive and driven pulleys; and adjusting means for raising and lowering said mandrel and its associated saw blade and tilting said support structure and saw blade for bevel cutting comprising a pair of concentric shafts journalled for rotation with respect to said support quadrant, one of said shafts having an end gear coupled to said mandrel bracket and the other of said shafts mounting a pulley and fixed cable assembly having oppositely directed cable ends adapted for connection to the opposite cabinet side walls, respective hand operated actuating elements connected to said shafts adapting said shafts for independent operation by an operator to respectively effect raising and lowering movement of said mandrel and its associated saw blade and tilting of said support structure and said saw blade relative to the table of said table topped cabinet and respective locking nut elements for independently locking said shafts against rotation with respect to said support quadrant.

2. The support structure of claim 1 wherein said concentric shafts are journalled by a sleeve member rotatably adjustably fixed to said front end plate, said one of said shafts being journalled internally of said sleeve member and said other of said shafts being journalled externally of said sleeve member.

3. The support structure of claim 2, wherein said sleeve member adjacent the front face of said front end plate is formed with an enlarged diameter portion providing an axially directed abutment face and adjacent its opposite end is provided with a threaded portion, said other of said shafts comprises an elongated pulley hub extending between said abutment face and said threaded shaft portion and one of said locking nut elements comprises a nut threaded on said threaded shaft portion for opposite relative threading movement to selectively clamp said other shaft between said abutment face and the opposed face of said nut and to free said other shaft for relative rotation with respect to said sleeve member.

4. The support structure of claim 3 together with a pointer adjustably fixedly mounted on the free end of said other shaft and a graduated scale formed on the adjacent cabinet wall for cooperation with said pointer to provide a visual indicator for indicating the various selected tilted positions of said saw blade relative to the table of said table topped cabinet.

5. The support structure of claim 2 wherein said one shaft is journalled in said sleeve member with its opposite ends protruding from the ends of the sleeve member; said gear coupled end of said one shaft non-rotatably mounts a worm pinion and an antifriction washer, said washer being abuttingly disposed between the opposed end faces of said sleeve member and said worm pinion; said hand operating element of said one shaft comprises a hand wheel non-rotatably fixed to said one shaft adjacent its other end with a fibre washer abuttingly disposed between its hub end and the opposed end of said sleeve member; said locking nut element of said one shaft comprises a cap nut threaded in the other end of said one shaft and adapted, upon threading it home into clamping engagement with the hub of said hand wheel to frictionally grip the respective fibre washers between the sleeve end faces and the respective hubs of the worm pinion and hand wheel to lock the mandrel bracket in its selected position.

6. In a tilting arbor saw or like machine tool comprising a support cabinet having an apertured front wall and rear and opposite side walls, a work support table fixed to said support cabinet and a tool support structure mounted for lateral tilting movement with respect to said cabinet and work support table and including a tool mount movably carried by said tool support structure for raising and lowering the supported tool relative to said work support table: means for effecting tilting and raising and lowering movement of the supported tool comprising journal means fixed to said tool support structure and extending lengthwise of said cabinet structure toward the cabinet front wall; shaft means journalled by said journal means and extending beyond the opposite ends of said journal means, one end of said shaft means extending through said apertured front wall and the other end lying adjacent the tool mount of the tool support structure; motion transmitting means interposed between said other shaft end and the tool mount for imparting raising and lowering movement to the tool mount; rotation means fixed to said one end of said shaft adapting said shaft to be selectively rotated in opposite directions by an operator to effect raising and lowering movement of the tool mount; and pulley means journalled on said journal means for independent rotational movement by an operator to effect unitary tilting movement of said tool support structure and all elements supported by it to effect angular positioning of the supported tool relative to the work support table, said pulley means including a pulley wheel, a cable encirclingly engaging said pulley wheel with its opposite ends fixedly connected to the opposite cabinet side walls, means fixing the approximate midpoint of the encircling cable portion to said pulley wheel and lever means accessible to the operator for selectively rotating said pulley wheel in opposite directions from a normal initially established non-tilted tool position to effect relative movement of said pulley wheel along said cable toward a respective fixed end to effect a predetermined tilting movement of the supported tool.

7. In combination, in a tilting arbor saw, a quadrant member and a mandrel bracket member, a cabinet including side walls and a table surface supported by said side walls, means connecting said quadrant member and said mandrel bracket member to each other for relative elevating movement of said mandrel bracket member with respect to said quadrant member, means connecting said quadrant member to said cabinet for tilting movement relative to said cabinet, fixed shaft means journalled in said quadrant member and operably connected to said mandrel bracket member to adjust the position of said members with respect to one another, and means for adjusting said quadrant member to effect tilting movement of said quadrant member with respect to said cabinet comprising: a rotatable element fixedly connected to said shaft means, tensioned flexible means secured to said cabinet and engagingly encircling at least a portion of said rotatable element, and means for effecting relative movement of said rotatable member along said flexible means to a selected fixed adjusted position, said flexible means being arranged relative to said rotatable element such that relative movement of said rotatable element along said flexible means tilts said quadrant member.

8. In a saw, mandrel bracket element and a quadrant element, means connecting each to the other for relative movement with respect thereto and means connecting both said bracket and said quadrant elements to the saw cabinet for adjustment with respect to said cabinet including means for adjusting each of said elements independently of the other comprising a first sleeve member fixedly secured in one of said elements, a shaft-like member rotatably mounted within said first sleeve member and projecting outwardly of one side of said cabinet, a second sleeve member rotatably mounted concentric of said shaft-like member and having a hand manipulatable element projecting outwardly of one side of said cabinet, said first member having cooperating gear means connected thereto operative to adjust one of the first two mentioned elements with respect to the other, a pulley wheel mounted rigid with said second member, and means connecting said pulley wheel to said cabinet and providing movement of said second sleeve member laterally of the sides of said cabinet opposite said one side upon relative movement of said second sleeve member relative to the first sleeve member comprising a cable reeved over said pulley wheel and having its opposite ends connected to said cabinet, said pulley wheel being operative upon rotation of said second sleeve member to take up the cable on one side of said pulley wheel and to pass cable off the other side of said pulley wheel for movement of said pulley wheel along said cable.

9. A control support structure for mounting a tilting arbor saw in an enclosing table topped cabinet having trunnion support means secured therein comprising: a support quadrant having trunnions for suspending said support quadrant from the trunnion support means; a mandrel rotatably supported on said quadrant and having a saw blade fixed thereon; drive means effectively connected to said mandrel to rotate said mandrel and said saw blade; and means for tilting said support quadrant and saw blade comprising a member journalled for rotation with respect to said support quadrant, a pulley fixedly mounted on said member, a cable encircling at least a portion of the periphery of said pulley and having its ends fixed to opposite cabinet walls, means fixing said cable at a point intermediate its ends to the pulley, and means accessible to an operator for manually rotating said shaft and pulley to effect relative tracking movement of said pulley along said cable, thereby causing a tilting movement of said quadrant and said saw blade.

References Cited in the file of this patent

UNITED STATES PATENTS

| 2,625,966 | Copp | Jan. 20, 1953 |
| 2,678,071 | Odlum et al. | May 11, 1954 |
| 2,844,173 | Gaskell | July 22, 1958 |

FOREIGN PATENTS

| 938,932 | Germany | Feb. 9, 1956 |